United States Patent
Chinal

[15] 3,660,837

[45] May 2, 1972

[54] METHOD AND DEVICE FOR BINARY-DECIMAL CONVERSION

[72] Inventor: Jean Pierre Chinal, 6, Rue Felicien-David, Paris 16e, Seine, France

[22] Filed: Aug. 10, 1970

[21] Appl. No.: 62,637

Related U.S. Application Data

[63] Continuation of Ser. No. 594,873, Dec. 16, 1966, abandoned.

[52] U.S. Cl. ....................................235/155, 340/347 DD

[51] Int. Cl. ....................................H03k 13/24

[58] Field of Search....................235/154, 155; 340/347 DD

[56] References Cited

UNITED STATES PATENTS

| | | | |
|---|---|---|---|
| 3,018,047 | 1/1962 | La Mana | 235/165 |
| 3,019,975 | 2/1962 | Williams | 235/155 |
| 3,026,034 | 3/1962 | Couleur | 235/155 |
| 3,039,691 | 6/1962 | Fleming, Jr. et al. | 235/165 |
| 3,082,950 | 3/1963 | Hogan | 235/165 |
| 3,151,238 | 9/1964 | Symons | 235/155 |
| 3,172,097 | 3/1965 | Imlay | 340/347 |
| 3,257,547 | 6/1966 | Bernstein | 235/155 |
| 3,373,269 | 3/1968 | Rathbun et al. | 235/155 |
| 3,432,811 | 3/1969 | Rinaldi et al | 235/155 |

*Primary Examiner*—Maynard R. Wilbur
*Assistant Examiner*—Charles D. Miller
*Attorney*—Karl W. Flocks

[57] ABSTRACT

A method for conversion of a binary number to the decimal system utilizing division of the binary number by 2 with storage in memory of the remainder corresponding to the binary figure of smaller order of the number and a sequence of operations on the quotient to effect division by 5 so as to obtain at each sequence a number associated with the quotient of successive divisions by 10 of the number to be converted, and a number associated with the remainder of this same division, the remainder then constituting a decimal figure of the converted number.

A conversion device constituted by a counter of elementary times or a clock, an input register with $n$ bits positions, a main shifting register with $n + 2$ bits positions, a correction shifting register with four positions of bits for formation of the correction in finding the true quotient of division by 5, a series adder with variable connections and a carry-over trigger device for establishing the above connections during the course of the cycle of operation and for sequencing the device, a programming device and an output register for presentation of the decimal figures.

31 Claims, 9 Drawing Figures

Inventor:
Jean Pierre Chinal
By
Karl W. Flocks
Attorney

Inventor:
Jean Pierre Chinal
By
Karl W. Flocks
Attorney

Inventor:
Jean Pierre Chinal
By
Karl W. Flocks
Attorney

Inventor
Jean Pierre Chinal
By
Karl W. Flocks
Attorney

Inventor:
Jean Pierre Chinal
By
Karl W. Flocks
Attorney

Inventor:
Jean Pierre Chinal
By
Karl W. Flocks
attorney

METHOD AND DEVICE FOR BINARY-DECIMAL CONVERSION

This case is a continuation of application Ser. No. 594,873 filed Dec. 16, 1966, now abandoned.

The present invention relates to a method of analysis and conversion of a binary number to the decimal system, in particular to the binary-coded decimal system.

The invention also concerns a binary-decimal conversion device or converter for carrying into effect the above method and which can be produced in series, series-parallel or parallel versions, according to the alternatives given below.

A large number of calculators utilize as an internal indication of quantities, the pure binary code. However, the information delivered by a computer is utilized in the decimal form and is read for example on dials with decimal graduations, or by electronic visual means such as visual presentation on oscilloscopes, on electro-luminescent or electro-incandescent panels, or utilized in mechanical decimal counters, on printers, etc., by a human operator.

Furthermore, in certain cases, it happens that an arithmetic system working in pure binary, must supply information to another arithmetic system working in the decimal code, and especially in a binary-coded decimal code.

The normal operation of these various systems utilizes a binary-decimal conversion which must then be effected automatically. In addition, in certain cases, during the design or testing of systems working in pure binary, it is sometimes necessary to examine certain parameters during the course of testing, and this independently of the recordings of various types which may be effected for the purpose of subsequent examination. It is then advantageous to be able to relieve the operator of the manual conversion of the binary numbers to decimal numbers by means of an independent reading apparatus. In this latter case, the rapidity requirements in respect of the time of conversion are not very severe.

Depending on the cases concerned, the known conversion devices utilize generally:

either electro-mechanical means, for example if the decimal information output is carried by a mechanical system of the rotating counter type with a rotary shaft, one method then consists of using a binary coder in the return loop of a numerical servo-control system and directly employing the position of the output shaft to indicate in decimal the number read. Other methods utilizing electro-mechanical processes are also possible;

or electronic or electrical means; these are required when it is proposed to utilize an electronic visual presentation system (oscilloscope, electro-luminescent panel, decimal characters intended to be illuminated or projected, etc.) or when it is required to effect transmission of numerical information between two arithmetic systems, from a system working in pure binary code to a system working in the decimal code. In this case, it becomes necessary to make the conversion by electronic means, passing then through the intermediary of codes of the binary-coded decimal type.

The conversion from pure binary to binary coded decimal code can be effected in several ways. For example, there may be employed an adder-subtracter and a table of binary representations of the powers of 10 or powers of 10 multiplied by the numbers from 0 to 9. The adder-subtractor may be that of the main arithmetic unit and may be wired or programmed to obtain the conversion. It may be separate from it and will then be wired separately. Other methods utilize decimal counters.

The disadvantages of the methods referred to above are, depending on the case, dependence on a calculator or the cost when it is desired to make an independent system. On the contrary, the present invention is particularly well adapted to the production, amongst other applications, of an independent system, with all its alternative forms.

In addition, in the case of the series alternatives, which are slower, it represents a simple and economic system provided however with a rapidity much greater than the conventional methods of conversion by counting. In the case of entirely parallel versions, the cost in number of components is approximately proportional to the square of the length $n$ of the words to be converted, which is less than certain conventional parallel solutions, in which the cost is of the exponential type.

Amongst other advantages of the conversion device according to the invention:

It converts whole binary numbers or the whole portion of mixed binary numbers, that is to say comprising a fractional portion. In the case where the binary numbers to be converted may a priori be mixed, the conversion of the fractional portion and the mixed portion is effected in two distinct phases; however, they essentially utilize the same basic members by means of a switching over of certain inputs of these members. The cost in components of a system effecting the conversion of mixed numbers is thus hardly greater than that of a system which effects solely the conversion of whole numbers. This is especially true of the series and series-parallel versions.

By virtue of the method of conversion adopted, the two phases of conversion of the whole portion and the fractional portion are very substantially symmetrical, and this symmetry results precisely in the possibility of using a large part of the converter in both phases by the use of simple switching.

The converter does not employ any memory of constants. This is of special advantage when it is desired to produce an independent conversion device and when it is then not possible to use part of the memory of a calculator.

It can be produced in series, series-parallel or parallel versions. In the series case in particular, a number of alternative forms are possible, having different costs in components, and the conversion times of which are very substantially in the ratios 1, 2 and 3.

It is possible to produce a converter of this kind for any length $n$ of the binary numbers to be converted. However, as will be seen later, the binary-coded decimal code in which the decimal figures are supplied directly by the converter depends on this maximum length $n$ of the numbers to be converted.

This code can be directly employed in a large number of applications. However, if for certain applications, there is required a well-defined binary-coded decimal code, a system of conversion of the code of the converter to the desired code will be utilized. Under these conditions, the system will generally be simpler when $n$ is a multiple of 4, and there will then be an advantage in taking a length $n$ for the numbers to be converted, the registers which contain them and other repetition elements, which are the multiple of 4 immediately greater than or equal to the maximum length of the binary words which it is desired to convert for the applications considered.

However, as has already been seen, this is not a necessity and there will be examined below both the principal version with $n = 4p$ and the modifications to be made to this for the cases $n = 4p + 1$, $n = 4p + 2$ and $4p + 3$, which are the other three separate existing cases.

The conversion time is fixed for each alternative form. It would however be possible to envisage modifications permitting the conversion time to be reduced when the effective length $n$ of the word is less than the maximum length defined above. These are easy when starting from one of the basic versions described later.

For this reason, no description will be given of those modifications which can be undertaken by any professional person familiar with the technique of arithmetical computers. The values of these conversion times will be indicated below for the basic alternatives and will be subject to slight variations as a function of the modifications of the type of those referred to above.

The whole of the converter can be constructed with electronic gates and trigger units, with discrete components or components formed in integrated circuits, in micro-circuits of all kinds, such as thin film circuits, hybrid circuits, etc., or again in magnetic circuits, and, speaking generally, by means of any complete assembly of logic elements and also memory elements of the same type as those employed in the construction of arithmetical computers.

By means of the addition of conversion systems with 4 inputs for each decimal figure, the converter can be used to effect the conversion to any desired binary-coded decimal code having $d$ binary digits ($d > 4$).

By means of simple modifications which will be described later, the converter can carry out a conversion from the binary code to any other desired whole base. Other applications are possible, such as in the case of conversion of a pure binary code to a code utilizing $K$ whole bases ($K > 1$). They will be deduced from those which will be described later by simple modifications familar to those skilled in the art, and for this reason, the examples of converters which are described below do not constitute a limitative list.

To this end, the method of conversion of a whole number $S'$ expressed in the binary system and with a maximum of $n$ figures, to its equivalent number in the binary-coded decimal system is characterized by the fact that there is effected, so as to obtain the successive remainders and quotients of repeated operations following the known principle of division by 10 and finding the partial remainders:

The division of the binary number $S'$ by 2 with storage in memory of the remainder corresponding to the binary figure of smaller order of the number;

A sequence of so-called "residuation" operations on the quotient $S$ obtained after division by 2, so as to effect the division by 5 of the said number $S$ in an "adder-residuator" device by treating during the course of each successive sequence, a binary digit $S_k$ of rank $k$ of $S$ by clock time in order to find a number $X_k$ and a number $R_k$ which are associated by recurrence at the numbers of lower rows by the logical relations which utilize the simple operations:

(or exclusive)

$$X_k = S_k \oplus X_{k-2} \oplus R_{k-1} \quad (1)$$

(majority function)

$$R_k = \mathrm{Maj}\,[X_k,\ X_{k-2},\ R_{k-1}] \quad (2)$$

so that there is obtained at each sequence or repetition a number $X$ associated with the quotient of the successive divisions by 10 of the number to be converted, and a number $R$ associated with the remainder $R'$ of this same division, the number $R'$ then constituting a decimal figure of the converted number.

Generally speaking, the conversion device in series numeration of a number expressed in the binary system to its equivalent decimal number, utilizing the foregoing method, is essentially characterized by the fact that it is constituted by the assembly:

of a clock or counter of elementary times;

of an input register with $n$ bits positions;

of a main shifting register with $n + 2$ bits positions and provided with a forward movement control, two extreme positions of the said register serving to write the portion $X_{n+1}\ X_n$ of the "residue" formed at each cycle of operation;

of a correction shifting register with four positions of bits for the formation of the correction in finding the true quotient of the division by 5;

of an "adder-residuator" device constituted essentially by a series adder with variable connections and by a carry-over trigger device of a switching system which established the above connections during the course of the cycle of operation, and for each sequence of the conversion device;

of a programming device supplying, in association with the elementary time counter, the data necessary for the control of the cycles and sequences of operation;

and an output register for the inscription and, when so desired, the visual presentation of the decimal figures constituting the desired decimal number.

In accordance with other characteristic features which will be explained below, the present invention provides:

Several alternative methods of conversion and in particular of conversion of a number comprising a fractional portion;

several alternative forms of converter in the series, series-parallel and parallel types of varying cost and rapidity, and comprising a particular arrangement and number of "adder-residuator" devices.

Other advantages and characteristic features of the present invention will be brought out below in the description which follows with reference to the accompanying drawings relating for the convenience of the description but not in any limitative manner to a series basic converter.

Figure 1:
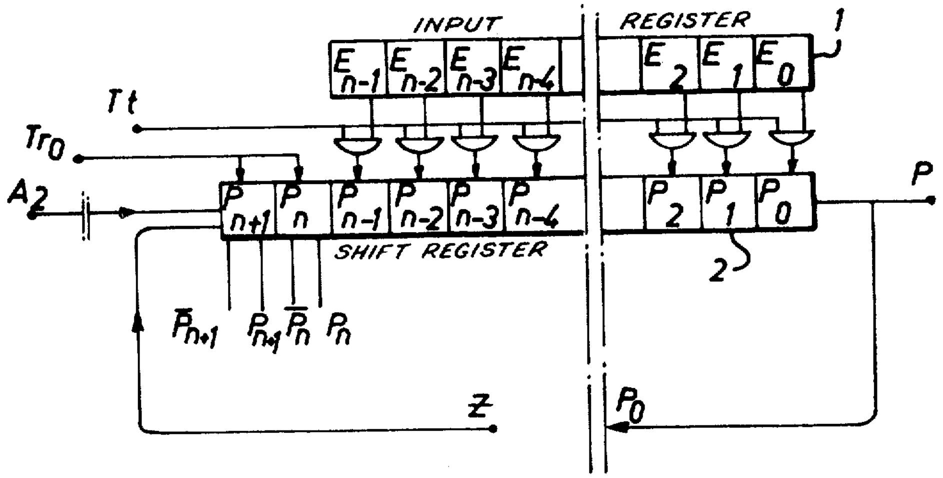
FIG. 1 is a partial synoptic diagram of one possible form of construction of the input of a converter according to the invention, together with the main shifting register, the operation of which is thus illustrated.
Figure 7:
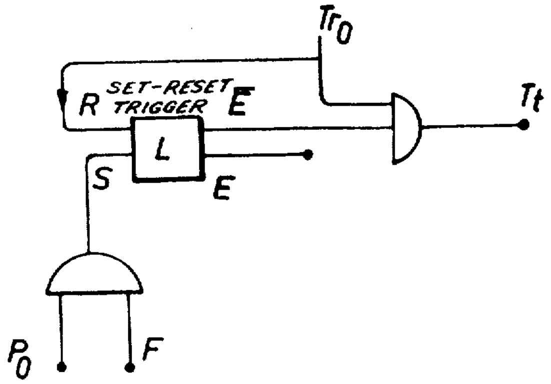
FIG. 7 is a synoptic diagram of one form of construction of an end of conversion detector of the programming device of the converter according to the invention.

As has already been stated above, the converter exists in several versions of varying cost and rapidity. In order to simplify the description, there will be described the method of conversion employed in the optical system of the simplest converter which can be constructed in accordance with said method (series converter) and the examples employed will be explained for the case of a reference length of binary word $n = 12$, it being understood that the use of the converter is not limited either to this particular version or to this particular length of word.

The conversion will also be described for the binary-decimal case. All the indications necessary to obtain the general operation of the various converters and for different lengths of word and, when so desired, for conversions of binary numbers to numbers in any whole base system or in a system of multiple whole bases, will be given below in the form of modifications to be made, and for this reason, the description will not be repeated as a whole for each time.

The method employed is based on the algorithm of successive divisions by 10 according to the conventional arrangement, as follows:

The number $N$, which is written in the pure binary system:

$$N_2 = B_{n-1}\ B_{n-2}\ \ldots\ B_k\ \ldots\ B_1\ B_0$$

is written in the decimal system:

$$N_{10} = D_{m-1}\ D_{m-2}\ \ldots\ D_i\ \ldots\ D_1 D_0$$

in which $B_k$ is one of the two binary digits 0 or 1, $D_i$ being one of the 10 decimal figures from 0 to 9.

In the standard method, repeated divisions by 10 are carried out according to the following arrangement:

$$N = 10\ N_1 = r_0$$
$$N_1 = 10\ N_2 = r_1$$
$$-$$
$$(0 \quad r_k \quad 9)$$

$N_k \; 10 \, N_{k+1} + r_k$ $(k = 0, 1, 2, \ldots)$ until $N_{m-1}$ is obtained such that $N_{m-1} < 10$, at which the process is stopped. We then have:

$$r_k = D_k \; (k = 0, 1, 2, \ldots m-1)$$

At each repetition, it is therefore necessary to determine two numbers $N_{k+1}$ and $r_k$ such that there is obtained:

$$N_k = 10 \, N_{k+1} + r_k.$$

Thus, the device according to the invention provides a choice between two things:

having a binary word of which it is known that it is of the form $S' = 5Q$, it makes it possible to find $Q$ without passing through the usual algorithms of division met with in calculating machines.

having a binary word $S'$ of which it is not known whether it is a multiple of 5 or not, it permits, by two sequential explorations of the binary word $S'$, the determination of the remainder and the quotient of $S'$ by 5.

Under these conditions, the division of a binary word $S'$ by 10 is effected, from the operational point of view, in two phases: division by 2 and putting into memory of the remainder $S'_0$, in which $S'_0$ is the binary figure of the lowest order of $S$, then division by 5 by means of the device known as an "adder-residuator".

The division by 2 of a pure binary word is immediate and consists, as is known, in displacing by one position towards the right the contents of a shifting register. The new contents resulting from this operation will be called $S$. The binary digit $S'_0$ which was located on the extreme right before the shift, is thereby caused to overflow on the right hand side: It constitutes the remainder of the division by 2 and is put into a memory of one bit, such as an electronic trigger circuit.

The division by 5 is effected by means of the device known as an "adder-residuator" which, in the series case being considered at the moment, carries out a transformation between binary symbols which is as follows: it treats the binary digits of $S$, digit after digit (one per clock time in the series case) and the sequence:

$$S = S_{n-1} \ldots S_k \ldots S_2 \, S_1 \, S_0 \; (n \text{ binary digits})$$

($k$ increasing with time).

The symbols $S_k$ of $S$ constitute the input sequence for the "adder-residuator". At each clock time $t_k$, this latter carries out the following operations: it determines a binary symbol $X_k$ and a binary symbol $R_k$. Knowing $X_{k-2}$ and $R_{k-1}$ which have been previously determined and memorized, it effects the modulo 2 sum of $X_{k-2}$, of $R_{k-1}$ and of $S_k$. It then effects the calculation of $R_k$ in the same interval between two clock times: $R_k$ may be expressed as being 1 if there is a majority of 1 on the three symbols $X_k$, $X_{k-2}$, $R_{k-1}$. A system of equations for this transformation is for example:

$$X_k = S_k \quad X_{k-2} \quad R_{k-1}$$

$$R_k = \text{Maj}\,(X_k, X_{k-2}, R_{k-1}) = X_k X_{k-2} + R_{k-1} X_k + R_{k-1} X_{k-2}$$

$$(\text{with } X_{-1}, X_{-2} = 0, R_{-1} = 0)$$

The symbol ⊕ represents the operation known as the sum modulo 2 or also "or exclusive" in logics. The symbol Maj ($A$, $B$, $C$) represents the majority function of $A$, $B$, $C$ which is equal to 1 when two inputs or the three inputs are equal to 1, and is 0 in the other cases.

That which has been stated above describes the operation of the series "adder-residuator". It will be observed that the formula which gives $X_k$ is essentially that giving the binary digit of the sum in a series adder, and that the formula which gives $R_k$ is that of the carry-over for this same adder device, if the present meaning of the inputs is neglected.

It can thus be seen that by switching of the inputs, the "adder-residuator" can play either the part of an ordinary series adder or the special part which will be called the "residuator" function. It is further observed that the above equations for a given rank $k$ assume that $R_k$ is determined after $X_k$, which can be effected in practice in the same interval between clock times, but necessitates however that the electric signals are propagated through the system which gives $X_k$ and then through that which gives $R_k$, the output of the system giving $X_k$ ("sum" system) serving as the input for the system giving $R_k$ ("carry-over" system). In the case in which this would result in too long propagation times, it is always possible to employ, both for $X_k$ and for $R_k$, systems (for example, with two levels of operators OR, AND, negation) which give $X_k$ and $R_k$ directly. A possible expression for a system of this kind is for example, using the same notations:

$$X_k = S_k \oplus X_{k-2} \oplus R_{k-1}$$

$$R_k = \bar{S}_k X_{k-2} + X_{k-2} R_{k-1} + \bar{S}_k R_{k-1}$$

The first equation is identical with that which has already been given above. The second gives $R_k$ directly this time as a function of $X_{k-2}$, $S_k$, $R_{k-1}$. It will be noted in this case that it has the form of the carry-over of a series subtraction if the particular direction of the letters is again neglected.

In the test which follows, the term "residuation" will be employed for the operation which consists of treating the word $S$ sequentially in order to obtain the words $X$ and $R$, by effecting the operation up to rank $l (l \geqslant n-1)$ included. More particularly, there will be described here the "residuation" effected on the word:

$$00 \quad S_{n-1} \, S_{n-2} \ldots S_k \ldots S_1 \, S_0$$

that is to say the operation is carried out for $l = n + 1$. There is then determined a word which can be written $(X_{n+1} \, X_n \, X)$ where $X = X_{n-1} \, X_{n-2} \ldots X_k \ldots X_1 \, X_0$ and a word $R_{n-1} \, R_n \, R_{n-1} \ldots R_k \ldots R_1 \, R_0$.

Also in the text which follows, the term "residue" will be applied to the binary word which is written $(R_{n+1} \, X_{n+1} \, X_n)$. Under these conditions, after a sequential exploration of the binary word $S$, there has been determined in particular a word $X$, a word $(X_{n+1} \, X_n)$ and a carry-over $R_{n+1}$. It can then be shown that:

1. If $R_{n+1} = 0$, $S$ was a multiple of 5 and the word $X$ determined constitutes effectively the quotient of $S$ by 5.
2. If $R_{n+1} = 1$, $S$ was not a multiple of 5 $(S = 5\,Q + R)$ but the remainder $R$ of the division of $S$ by 5 is associated in an ambiguous manner with the "residue" $(R_{n+1} \, X_{n+1} \, X_n)$.

This correspondence between the "residue" and the remainder depends on the reference length $n$ chosen as the maximum length of the binary words to be converted. More exactly, we have four cases, depending on the value of the remainder of the division of $n$ by 4, and the correspondence in the four cases is given by the correspondence table below:

| | R | n: 4p | 4p+1 | 4p+2 | 4p+3 |
|---|---|---|---|---|---|
| $R_{n+1}=0$ | 0 | 00 | 00 | 00 | 00 |
| $R_{n+1}=1$ | 1 | 00 | 10 | 11 | 01 |
| | 2 | 01 | 00 | 10 | 11 |
| | 3 | 10 | 11 | 01 | 00 |
| | 4 | 11 | 01 | 00 | 10 |

It will be noted that when $n = 4p$, we have:

$$R = |X_{n+1} \, X_N| + 1 \text{ when } R_{N+1} = 0,$$

which, in certain cases, can be a simplification. It should also be observed that the "residue" $(R_{n+1} \, X_{n+1} \, X_n)$ constitutes in itself a special coding of the remainder of the division by 5 which can be used directly in certain applications in which it is not necessary to give the expression of $R$ in the pure binary form. In any case, if $R$ represents the magnitude of the remainder of the division by 5, the remainder of the division by 10 is $R' = 2R + S'_0$. Being given the word which represents $R$ in pure binary form, namely $r_3$, $r_2$, $r_1$, $2R + S'_0$ is then represented by a word $r_3$, $r_2$, $r_1$, $r_0$ where $r_0 = S'_0$, when it is desired to have a binary-coded decimal representation (code 8421) for the remainder $R'$ of the division by 10. In any case, the four binary digits $R_{n+1}$, $X_{n+1}$, $X_n$ and $S'_0$ constitute in themselves a special binary-coded decimal code of $R'$ which can be utilized directly in certain applications.

Thus, at the end of a sequence represented by $S$ followed by two zeros, the "adder-residuator" has produced a word $X$ and a residue $R_{n+1} \, X_{n+1} \, X_n$. This latter combined with $S'_0$ supplies the remainder $R'$ of the division of $S'$ by 10, as has already been seen. If $R_{n+1}$ is equal to 1, $X$ no longer constituted the quotient $Q$ of $S$ by 5, but the quotient $Q$ can be obtained from $X$ (and this will be known as the "pseudo-quotient" in the text which follows) by subtraction of a number $m'$ (known as the "correction of pseudo-quotient"). When $n = 4p$, this number $m'$ is such that its complement to 2, $2^n - m'$, is a number of which the binary representation is periodic with a period of 4. The period with four binary digits of this number is the representation in pure binary form of the number $3R$ and is given by the following table:

| R | one period of $2^n - m'$ |
|---|---|
| 1 | 0011 |
| 2 | 0110 |
| 3 | 1001 |
| 4 | 1100 |

It will be observed that these words of four binary digits are complementary in pairs (to 1) with respect to the line which divides the table into two halves of two lines. When $R = 0$, the correction is 0, as has already been seen above. Furthermore, when $n = 4p$, it is easily verified that the period is obtained in the following way from $(R_{n+1}\ X_{n+1}\ X_n)$. If $R_{n+1} = 0$, it is entirely formed by zeros. If $R_{n+1} = 1$, the period is written:

$$X_{n+1}\ X_n\ \overline{X}_{n+1}\ \overline{X}_n$$

When $n = 4p + 1$ ($0 < l < 3$) the correction in its form of a number to be added (modulo $2^n$) is obtained by taking $p$ periods as above plus a truncated period having the $l$ binary figures to the right of the normal period. The correspondence between the residue and the period of the correction can be determined either directly from$(R_{n+1}\ X_{n+1}\ X_n)$ or by passing through the representation of $R$.

To sum up, the determination of the quotient and the remainder is effected by dividing $S'$ by 2 (quotient $S$, remainder $S'_0$) and then by dividing $S$ by 5 (quotient $Q$, remainder $R$), the quotient $Q$ being equal to $X$ plus a correction. The remainder of the division by 10 is then $R' = 2R + S'_0$. The quotient of the division of S' by 10 is Q. The "adder-residuator" can be utilized either to find the remainder, the pseudo-quotient and the correction of pseudo-quotient, or to find the remainder without the pseudo-quotient and the quotient from $S' - (2R + S'_0)$ which is then a multiple of 10.

It will be noted that the remainder proper could be found by other methods; however, the "adder-residuator" can always be utilized to find the quotient of the number less its remainder.

Example of binary-decimal conversion (whole number).
Number to be converted: (12 binary digits).

```
S'= 1 0 0 1 0 0 0 1 0 1 0 1      (=2325)
                      0 0 1 0 0 1 0 0 0 1 0 1 0 1
                              ↓  (—1)
                      0 0 1 0 0 1 0 0 0 1 0 1 0 0
                              ↓  ( :2)
                 S=   0 0 0 1 0 0 1 0 0 0 1 0 1 0
    (Residuation) X=  0 1 1 0 1 0 1 0 0 0 0 0 1 0
         Carry-over:  1 1 1 0 1 0 0 0 0 0 0 0 0 0
                          R=2   R'=2S'0+2=5
                 X=   0 1 1 0 1 0 1 0 0 0 0 0 1 0
 (Correction) Q—X=    1 0 0 1 1 0 0 1 1 0 0 1 1 0
                 Q=   0 0 0 0 0 0 1 1 1 0 1 0 0 0
                              ↓  ( :2)
                 S=   0 0 0 0 0 0 0 1 1 1 0 1 0 0
    (Residuation) X=  0 0 1 1 0 0 1 1 1 0 0 1 0 0
         Carry-over:  1 1 1 1 1 1 0 0 0 0 0 0 0 0
                          R=1   R'=2R+0=2
                 X=   0 0 1 1 0 0 1 1 1 0 0 1 0 0
 (Correction) Q—X=    1 1 0 0 1 1 0 0 1 1 0 0 1 1
                 Q=   0 0 0 0 0 0 0 0 0 1 0 1 1 1
                              ↓  ( —1)
                      0 0 0 0 0 0 0 0 0 1 0 1 1 0
                              ↓  ( :2)
                 S=   0 0 0 0 0 0 0 0 0 0 1 0 1 1
    (Residuation) X=  0 0 1 1 0 0 1 1 0 0 1 1 1 1
         Carry-over:  1 1 1 1 1 1 1 1 1 1 1 1 0 0
                          R=1   R'=2R+1=3
                 X=   0 0 1 1 0 0 1 1 0 0 1 1 1 1
 (Correction) Q—X=    1 1 0 0 1 1 0 0 1 1 0 0 1 1
                 Q=   0 0 0 0 0 0 0 0 0 0 0 0 1 0
                              ↓  ( :2)
                 S=   0 0 0 0 0 0 0 0 0 0 0 0 0 1
    (Residuation) X=  0 0 1 1 0 0 1 1 0 0 1 1 0 1
         Carry-over:  1 1 1 1 1 1 1 1 1 1 1 1 0 0
                          R=1   R'=2
                 X=   0 0 1 1 0 0 1 1 0 0 1 1 0 1
 (Correction) Q—X=    1 1 0 0 1 1 0 0 1 1 0 0 1 1
                 Q=   0 0 0 0 0 0 0 0 0 0 0 0 0 0
             S=2325
```

In the text which follows, with reference to FIGS. 1 to 9, there will now be described a so-called basic series version of the converter. There will then be indicated the other series alternatives and the series-parallel and parallel alternatives.

The logical and memory elements which are shown on the drawings have been indicated symbolically. The memory elements are shown by squares having an input and two complementary outputs; the latter are shown when this is necessary for the clearness of the drawing and are implicit in the other cases. The symbolic input of a memory element such as a trigger unit for example, signifies that an input on this channel must involve the inscription, after a time-constant, of the value of this latter in memory in this unit. The adaptation of the various types of trigger units effectively existing (known as $R$—$S$, $J$—$K$, $R$—$S$—$T$, etc) and generally of the memory unit type utilized in obtaining the operation is a simple and entirely standard problem, and for this reason it will not be described.

A shifting register is represented by a long rectangle, itself formed by the juxtaposition of elementary squares which constitute its stages. In this case also the particular details of construction of the stages and their interconnections have not been shown (except as regards the return loop through the converter), since these are again determined by the particular technology employed and for this reason form part of the techniques of arithmetic computors. The direction in which the information is propagated is indicated by arrows on the conductors. In addition, the conditions AND and OR, which can be employed to form the various logical systems, have been shown by graphic symbols. The half-circle which is not traversed by right hand segments represents the gate AND, the other the gate OR. It is obvious that this method is employed to give a simple representation of the systems, and that it could be modified in order to take account of the logical elements actually utilized and which may be different, such as the circuits carrying out the AND or OR functions with complementation at the output, the majority functions, etc.

Finally, the complement (negation) of a binary variable is represented by the letter of the variable surmounted by a bar. In addition, there has been designated by $A_k$ the forward movement control channel of the shifting register $K$. On the other hand, the symbols $R_k$ and $R_{k-1}$ have been used for the input and the output of the carry-over trigger device ($R$) of the adder-residuator with the following meaning: the value which is applied at a certain clock time to $R_k$ is utilized at the output at the following time on $R_{k-1}$.

There is designated by $n$ the maximum length of the words in the pure binary system, capable of being treated by the converter. The positions and the non-barred outputs of the principal shifting register 2 which will be used are designated by $P_{n+1n} \ldots P_1P_0$, and those of the so-called correction register by $P'_3P'_2P'_1P'_0$. (the indices increasing with the orders).

Figure 4:
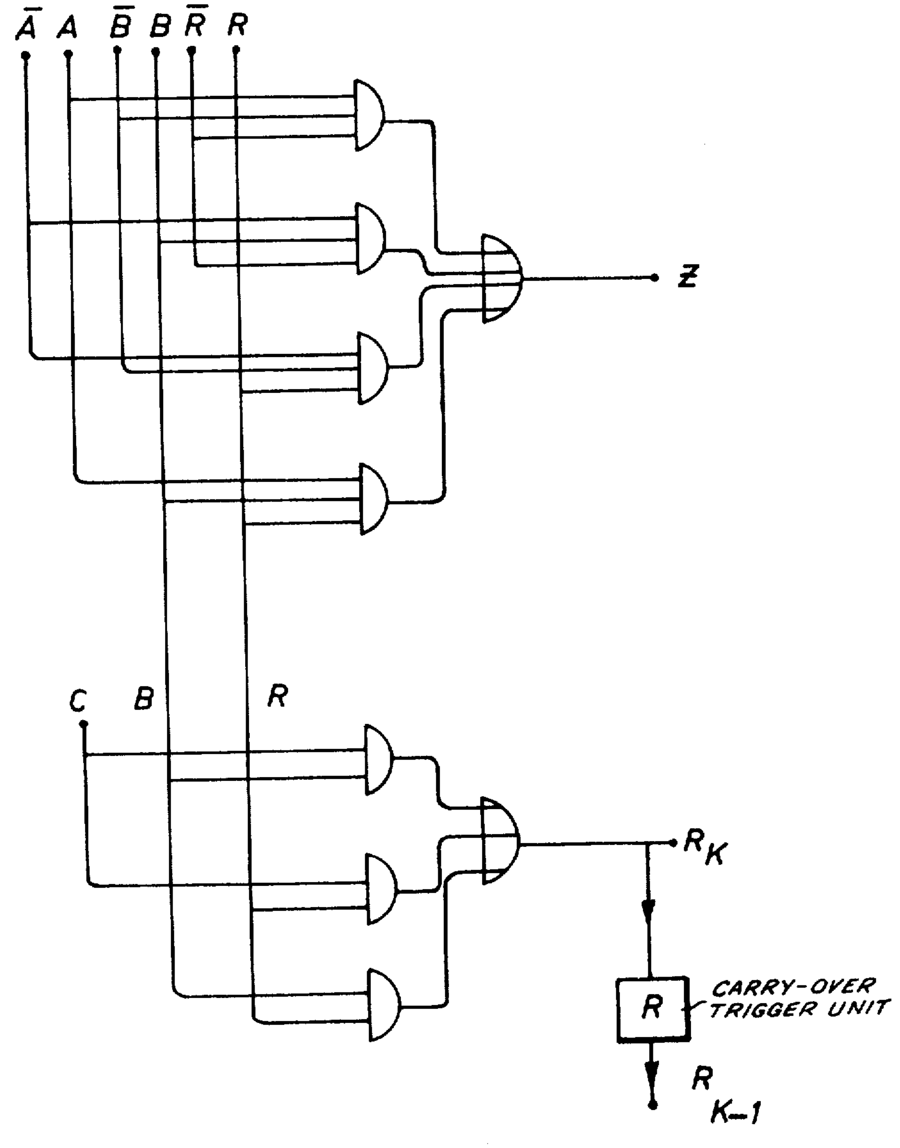
FIG. 4 is a block diagram of an alternative form of an "adder-residuator" device according to the invention, provided with its switching system and the carry-over trigger circuit.

The converter comprises essentially (FIG. 9):

A clock (4);

An input register 1 (FIG. 1) which can, according to the applications, be filled in parallel or in series. This register may not be necessary if the information can be directly transferred into the shifting register described below;

A shifting register 2 with $n + 2$ positions (FIG. 1.). This comprises a forward movement control obtained by the coincidence of the clock with signals described later. This shifting register is known as the "main-register" in the text which follows;

A shifting register 3 with four positions (FIG. 5) known as the "correction register" in the text below;

A central device known here as the "adder-residuator" and being capable of being constituted, as has already been seen, by a series adder with variable connections established by a switching system (FIG. 4);

A logical inscription unit of the three left hand digits of the binary code word of the decimal figure obtained during the course of one cycle. This unit is described for the code 1.2.4.8. in four alternative forms as a function of the length $n$ of the word. As has already been stated, in certain applications (visual indication) it is possible to utilize directly the word $R_{n+1} P_{n+1} P_n S'_0$ as the code word for the decimal figure found at each cycle. The above system is thus reduced to simple connections.

Figure 3:
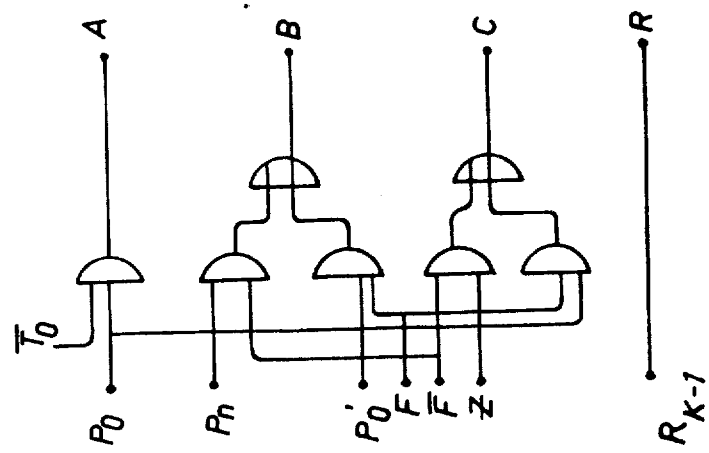
FIG. 3 is a diagram of the logical circuits which can constitute a switching system to equip an adder-residuator device such as shown in FIG. 4.
Figure 5:
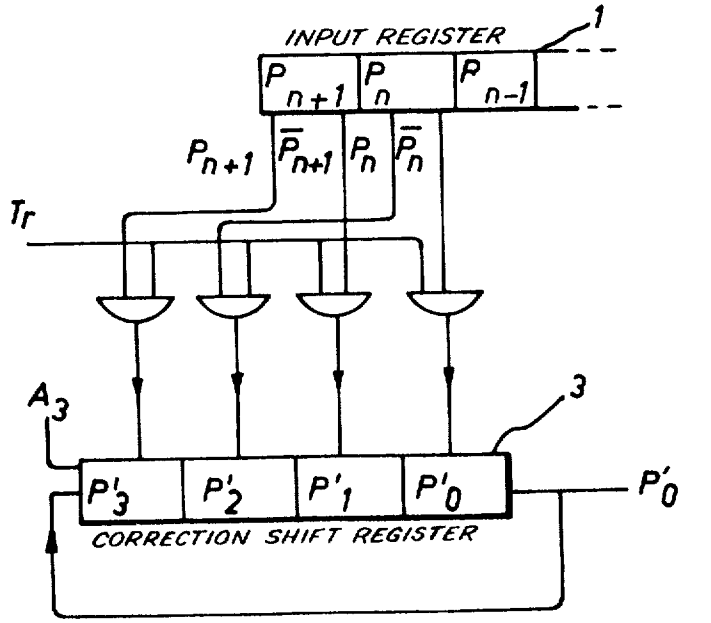
FIG. 5 is a diagram of one possible form of construction of the correction shifting register employed and of the writing unit of this latter in the case where $n = 4p$.
Figure 6:
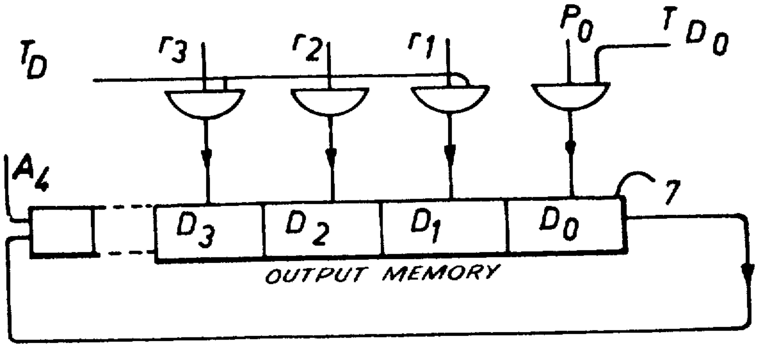
FIG. 6 is a block diagram of certain inscription control circuits of the partial remainders or decimal figures in the output memory.
Figure 8:
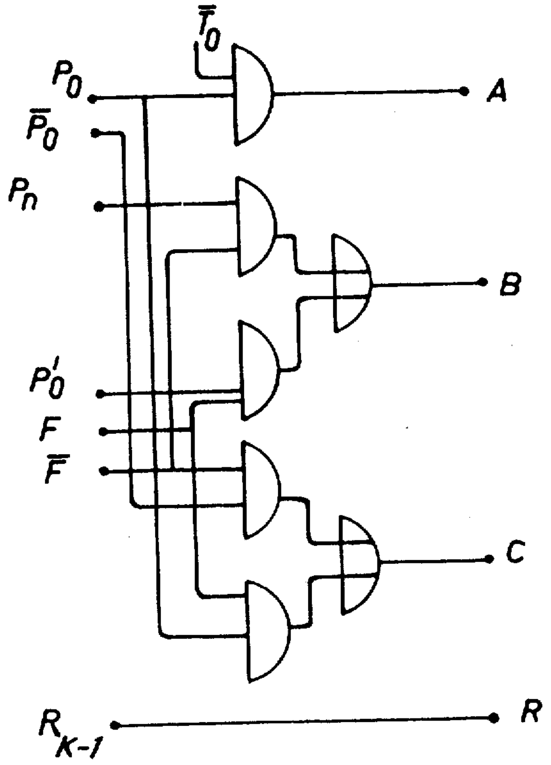
FIG. 8 is a diagram of another alternative form of the switching system shown in FIG. 3.

Finally, it is necessary to have an inscription control of the remainder $R'$ (irrespective of the code employed) in an output memory (FIG. 6):

An output memory (7). This memory receives the decimal figures and can be constituted by four stages of a shifting register which will shift by four positions so as to receive the following decimal figure. Other types of memory are possible, depending on the method of delivery of the decimal information. In particular, an arithmetic or analogue memory can be employed, or a combination of the two;

A switching system (addition-residuation) (FIG. 3 and FIG. 8);

A writing unit for the correction register (FIG. 5). This unit is reduced to simple connections when the length taken for the words is a multiple of 4;

An elementary time-counter;

Finally, certain gates and trigger units which, with the counter, constitute a kind of programming unit, the main function of which is to supply signals during the elementary times or during complete phases.

The operation of the complete device takes place in a certain number of identical cycles, each cycle corresponding to the determination of a decimal figure. The sequence of succession of the cycles is as follows:

$$N_k = 10\, N_{k+1} + r_k$$

$N_k$ is the contents of the positions $P_{n-1}\, P_{n-2} \ldots P_1 P_0$ of the shifting register at the beginning of the cycle $K$, $r_k$ is the decimal figure of row $k$. $r_k$ is deduced from the "residue" of the positions $P_{n+1}$, $P_n$ of the same register and from the condition of the carry-over trigger device ($R_{n+1}$) at the end of the first half of the cycle. $N_{k+1}$ is obtained at the end of the cycle.

To obtain each decimal figure necessitates two recirculations of the principal shifting register in the basic series version. The first re-circulation gives $r_k$ and the period of the correction, which is put into the correction register. The second re-circulation adds the correction to the contents of the shifting register, thus giving $N_{k+1}$. The sequence of the remainders of the successive divisions by 10 of the binary number is found, but this division by 10 and the determination of the remainder are effected, not by a general method of division, but by the special device which has been called the "adder-residuator".

There will now be described with reference to the corresponding drawings, in a more detailed manner, the constitution and the method of operation of the principal sub-assemblies above of the conversion device according to the invention, following the various possible alternative forms.

The principal shifting register 2 (FIG. 1) has the function of displacing its contents by one position towards the right at every clock time in which there is an elementary forward signal from the forward movement control $A_2$. It can be constituted by a shifting register with electronic trigger units using tubes or transistors, by a shifting register with magnetic elements, by a re-circulating register of a drum computer when this is possible by utilizing a drum track, or more generally by any means which permit a delay loop to be simulated from the functional point of view.

It may be designed with inscription of the data in series or in parallel, as may be required, that is to say in fact according to the manner in which the information is supplied to the converter.

On the other hand, for the positions of the register there must be available the output and its complement, which is easy for the majority of existing shifting registers.

If $n$ is the maximum length of the binary words to be converted, the shifting register has $n + 2$ positions. The determination of a decimal figure makes use of $n + 3$ shifts for the determination of the remainder and the pseudo-quotient, $n + 2$ shifts for the addition of the correction. The periods of the half-cycles may, when so desired, be made greater than the values $n + 2$ and $n + 3$.

In the case of the basic series version of the converter according to the invention, the pseudo-quotient is effectively determined and is inscribed binary digit after binary digit as and when the shifting register is displaced and utilized. At the end of the first re-circulation, the contents of the shifting register have thus been replaced by their pseudo-quotients. It must therefore be possible at each clock time to carry out this inscription. At an instant $k$, the symbol $S_k$ is located at the extreme right of the register and the symbol $X_{k-2}$ is located in the second position from the left of the register. At that instant, the symbol $X_k$ is prepared together with the writing control of $X_k$ in the position at the extreme lift position of the register, in such manner that at the time following, the contents of the shifting register for all the positions $P_i (i \geq 1)$ is displaced by one row to the right, and instead of having re-entered the value of the extreme right hand position in the extreme left hand position, as for a normal shifting register, there is entered in this position at the extreme left the new value $X_k$ which has been determined.

In a similar manner, it can be said that in the two re-circulations which constitute a cycle, the contents of the shifting register re-circulates through the "adder-residuator," with the following reservation;

During the first re-circulation, the binary figure of the lowest order must not be re-entered at the other end of the shifting register, in which a zero will be entered. To this end, this binary figure can be inhibited before its entry to the "adder-residuator", in which case a zero will be automatically entered in the extreme left hand position, on condition that it is assumed that at the beginning of each cycle the two positions at the extreme left contain a zero, and that the carry-over trigger which contains successively the symbols $R_k$ is itself at zero. It will be assumed that this is the case and that the two positions $P_{n-1}$, $P_n$ and the carry-over trigger unit are set to zero before the beginning of each cycle.

It should be observed that if it is desired to find the remainder to the exclusion of the pseudo-quotient, the method of conversion necessitates a memory which, at the moment of determination of $X_k$, contains the symbol $X_{k-2}$ in addition to the trigger unit which contains $R_{k-1}$. This can be obtained by a small shifting register with two positions (known as an "auxiliary register" in the text following): the left hand position contains $X_{k-1}$, the right hand position $X_{k-2}$.

At each clock time, $X_k$ and $R_k$ are determined from $X_{k-2}$, $S_k$, $R_{k-1}$ which are in this case in three memory devices; the two-position register (position at the extreme right), the main register (position at the extreme right) and the trigger unit containing $R_{k-1}$. In a manner similar to that described above for the principal shifting register, $X_k$ is re-entered in the left hand position of the small shifting register, $X_{k-1}$ is shifted towards the right and $X_{k-2}$ is rejected.

In its essentials, this is the method which is suitable for use when it is desired to determine only the remainder without disturbing the number $S$ subjected to the test. The adder-residuator with this shifting register is then a sequential system permitting the remainder to be determined. If this remainder can be subtracted from the undisturbed contents of the principal shifting register ($S$), the adder-residuator thus permits in a second application the determination of the exact quotient $Q$ of the division of $S$ by 5, that is to say of $S'$ by 10.

In addition, as will be seen later, this method is necessary if, as is desired in certain applications, the remainder (and the remainder only) is to be found for a number of simultaneous dividers $m_1, m_2 \ldots m_k$. The determination of the remainders is effected by a similar process with a principal register and as many small auxiliary registers as there are dividers $m_i$.

There will now be described by way of example two forms of construction of an adder-residuator utilized in the present invention.

The first form of construction is that in which an adder is used and a switching system which permits it to be employed either as an ordinary series adder or as a residuator operating on the sequence of binary symbols of the word $S$, of which there is to be found the remainder of the division by 5 and the quotient. This alternative form is shown in FIG. 4.

At the same time as the adder-residuator, a network is required which carries out the switching of the inputs of the system of FIG. 4. depending on whether the operation is in the residuation phase or in the addition phase of the correction. More precisely, the "adder-residuator" carries out the following operations:

During the first re-circulation of a cycle: at each clock time $t_{k-1}$ validated by the programming device and which follows the initial time $t_0$ (at which the division by 2 is initiated), it takes the modulo 2 sum of the contents of the position $P_0$ of the main shifting register, of the contents of position $P_n$ of the same register and of the unbarred output $R_{k-1}$ of the carry-over trigger unit ($R$) and enters this value $Z$ in the position $P_{n+1}$ of the register. Furthermore, after the time of establishment of this value at the output of the sum system of the "adder-residuator", the carry-over portion of the same system gives the value of the majority (equal to 1 if two or three symbols out of three are equal to 1) of $Z$, $P_n$ and of the output $R_{k-1}$ of ($R$), namely a binary figure which is re-entered in the trigger unit ($R$) so as to be available at the following clock time. This is $R_k$.

FIG. 3 shows the switching system which permits the combination $P_0$, $P_n$, $Z$, $R_{k-1}$ in the same order to be applied to the inputs $A,B,C,R$, during the residuation phase, and the combination $P_0$, $P'_0$ (see below) $P_0$, $R_{k-1}$ in the addition phase of the correction. In addition this same system has the function of inhibiting the passage of the value $P_0$ at the first time of the cycle in question (time $T_0$). The signal $F$ represents a half-cycle signal which makes it possible to distinguish between the two re-circulations. ($F=0$ corresponds to the first re-circulation and $F=1$ corresponds to the second).

A second alternative which has been briefly described above amounts to considering the residuator function as a subtraction function in which the meaning of the inputs has been modified. It is known that a series adder and a series subtractor have the same logical function which can be expressed by the same algebraic expression and the same circuit for the determination of the sum, and that only the expression of the carry-over is different, the carry-over of the subtraction having an algebraic expression which can be deduced from that of the addition by complementing the symbol of the figure belonging to the number from which the second is subtracted.

This justifies the method of switching illustrated in FIG. 8 and utilized for this second alternative form of the adder-residuator. The signal F again represents a half-cycle signal having the same significance as above for the version of FIG. 3.

During the second re-circulation, the system then functions as a true series adder, adding the contents of the principal shifting register and that of the correction register which re-circulates for $n+2$ times. The sum carry-over $R_{n-1}$ which is produced at the time $t_{n-1}$ is ignored, which means that the addition modulo $2^n$ is made.

Figure 9:
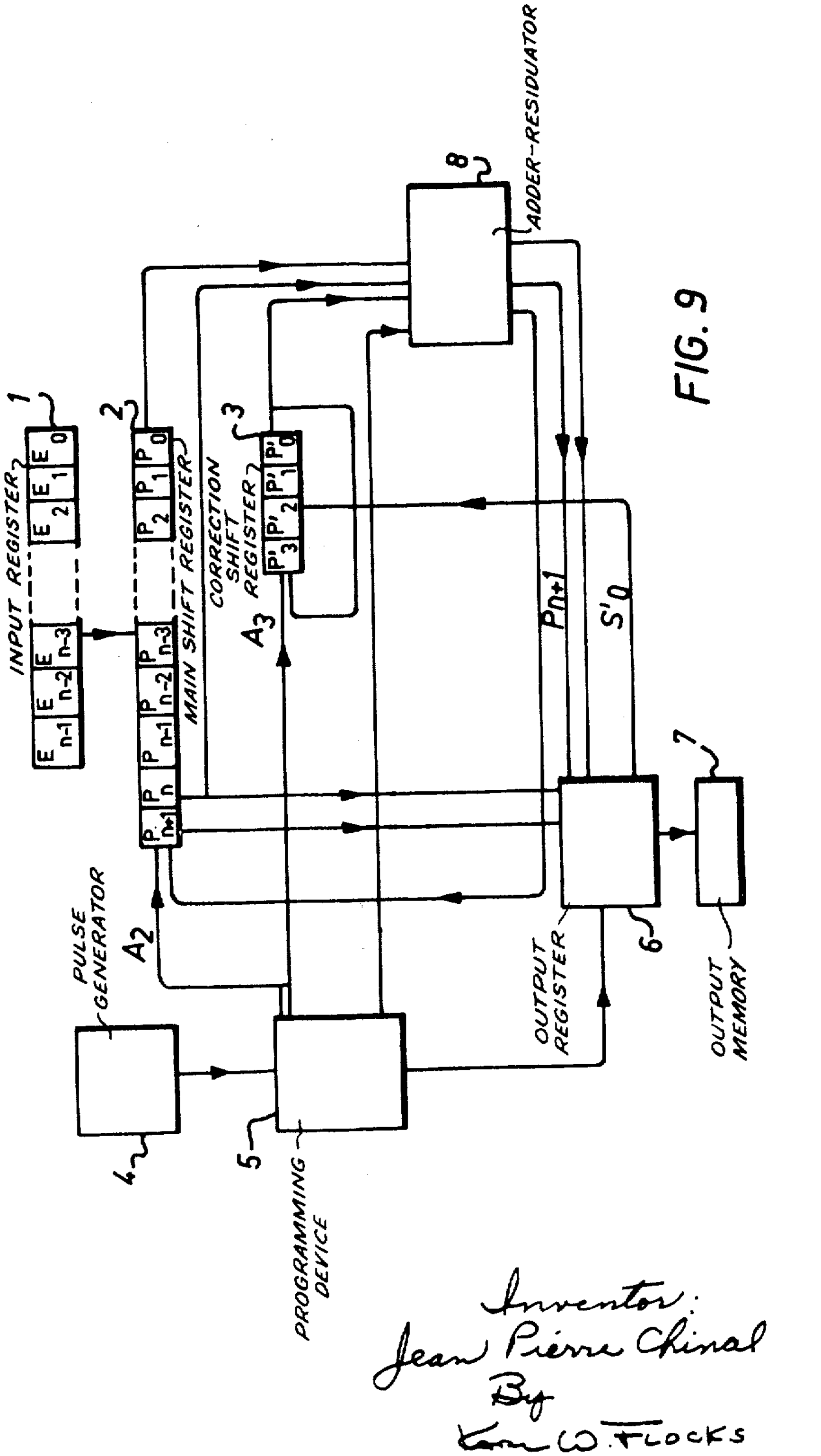
FIG. 9 is a general simplified block diagram of a series converter in accordance with the invention.

The counter 5 of elementary times, diagrammatically shown in FIG. 9, supplies elementary times which are represented as a function of time by the condition of the trigger units of a counter. When the converter is located in a computer, or associated therewith, it is often possible to derive these signals from the interior of the computer. For the converter impulses are necessary at each clock time and it is essential that these should be numbered in the order of the increasing whole numbers in order to be able to define the binary rank in course of treatment at each clock time.

The correction register shown in FIG. 5 is a shifting register with four positions. The system inscribes in it at the end of the first re-circulation, the number $3R$ which constitutes the first period of the number $2^n-m'$ obtained by repetition of the group of four corresponding binary digits. This latter then constitutes the number which is added as a correction during the course of the second re-circulation. The correction register has the same forward movement control as the principal register during the course of the second re-circulation.

In order to simplify the writing logic of the period, it may be set back to zero during the course of the first re-circulation of each cycle.

This register is utilized in the series versions in which there is simultaneously effected the finding of the remainder and of the pseudo-quotient. It is not used otherwise.

The carry-over trigger unit ($R$), of which one form of construction is shown in FIG. 4 and which is utilized in this case constitutes a memory of one bit, utilized in the sequential analysis of the word (first re-circulation) and as a normal addition carry-over trigger unit in the second re-circulation. The non-barred output of this trigger unit is always connected to the input designated by $R$ of the "adder-residuator". The carry-over output of this latter defines the value to be entered in the carry-over trigger unit so that it may be available at the time following.

The end of conversion detector employed in the converter according to the invention can determine the end of the conversion, either by counting the maximum number of decimal figures to be calculated or by detection of the zero of the quotient. In this latter case, this detection may be effected by the sequential circuit of FIG. 7. During the correction re-circulation ($F=1$), the symbols issuing from the adder unit (that is to say after addition of the correction) represent the quotient.

Through the intermediary of an AND gate, the other input of which is $F$, these symbols reach the input SET of a SET-RESET trigger unit ($S$—$R$). It is known that the application of 1 to the input SET puts the output of the trigger unit in the condition 1, and that the application of 1 to the RESET input puts the output at zero. If the sequence contains one or a number of 1, the trigger unit will change over to the condition 1 ($E=1$) during the course of this re-circulation. In consequence $\bar{E}$ passes to the condition zero and the output $T_f$ will remain zero when $T_{r0}$ becomes equal to 1 at the end of the cycle. On the other hand, if the sequence has been composed solely of zeros ($Q=0$) the output $T_f$ will take the value 1 at the moment when $T_{r0}$ takes the value 1. Similar arrangements are possible for the other alternative forms of the converter according to the invention.

As regards the output register employed, the four trigger units which serve to store a decimal figure (in the output code), $r_3$, $r_2$, $r_1$, $r_0$, may constitute the whole of the output registered (FIG. 6), if furthermore there is available another memory (7) (analog or arithmetic) to retain the successive decimal figures which are obtained. If not, they are constituted with advantage by four positions of a shifting register which is moved forward through four positions at the beginning of each cycle and which contains, after the conversion, the whole of the decimal number.

Conversion systems for the "residues" in their pure binary number are employed when it is desired to obtain the equivalent in pure binary system of the residue. Their construction is immediate and is derived from conventional techniques. There are given below simple Boole equations. These are not however in any way limitative.

Figure 2:
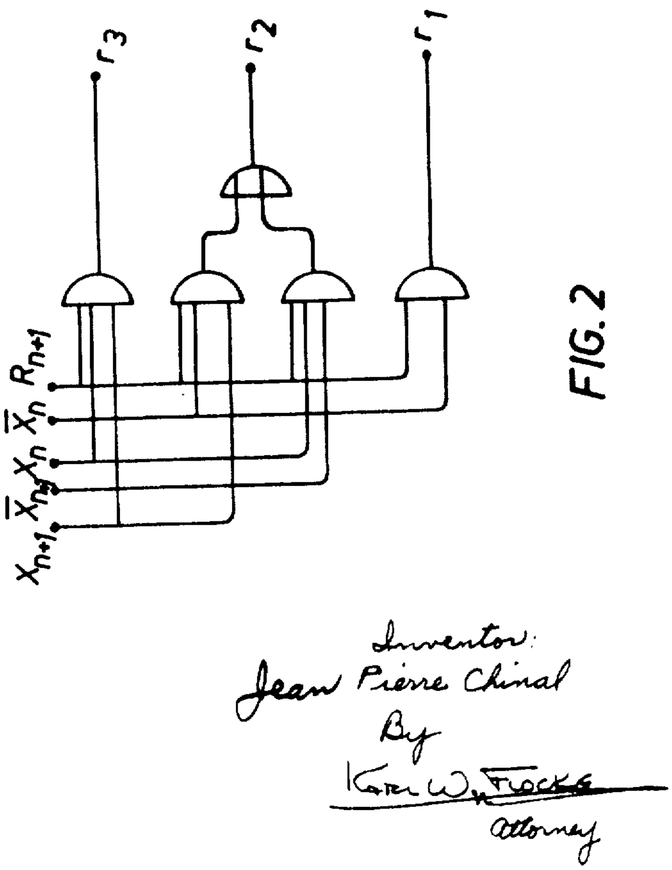
FIG. 2 is a partial diagram of certain logical circuits constituting the output register and in particular of one possible form of construction of the switching system connecting the said register to the principal shifting register and to the carry-over trigger device.

(1) $n=4p$ (case corresponding to Fig. 2)

$r_3=R_{n+1}X_{n+1}X_n$ $(r_2=R_{n+1}(X_nX_{n+1}+\bar{X}_nX_{n+1})$ $r_1=R_{n+1}\bar{X}_n$ (2) $n=4p+1$ $r_3=R_{n+1}\bar{X}_{n+1}X_n$ $(r_2=R_{n+1}(X_nX_{n+1}+\bar{X}_n\bar{X}_{n+1})$ $r_1=R_{n+1}X_{n+1}$ (3) $n=4p+2$ $r_3=R_{n+1}\overline{X}_{n+1}\overline{X}_n$ $(r_2=R_{n+1}(X_nX_{n+1}+\overline{X}_n\overline{X}_{n+1})$ $r_1=R_{n+1}X_n$ (4) $n=4p+3$ $r_3=R_{n+1}X_{n+1}\overline{X}_n$ $(r_2=R_{n+1}(X_nX_{n+1}+\overline{X}_n\overline{X}_{n+1})$ $r_1=R_{n+1}\overline{X}_{n+1}$, These equations define the said systems completely.

As has already been mentioned above, the operation of the basic series converter is controlled by a programming device which, in conjunction with the elementary time counter, comprises essentially the detection trigger unit for the end of conversion, the trigger unit $F$ for a half-cycle and systems giving impulses marked $T_i$ at instants $t_i$ $(i = 0, 1, 2, \ldots n + 2)$, together with the forward movement controls of the shifting registers. When so required, it comprises other functions effected by trigger units for example, such as the indication of the phases "whole-fractional", "first divider", "second divider", etc., according to the applications.

In the case where the converter forms part of a computer or is associated therewith, a certain number of signals may be supplied by this latter.

The basic series converter which is described here utilizes the following transfer and forward-movement control impulses:

1 Impulse $T_d$: writing the remainder in the output register. Re-setting to zero of the carry-over trigger unit.

1 Impulse $T_r$: transfer of the correction word to the correction register after the first re-circulation.

1 Impulse $T_{d0}$: transfer of $P_0$ into $D_0$ at the first time of the cycle

1 Impulse $T_i$: transfer of the number to be converted from the input register 1 into the main shifting register. There may be an additional prohibition to prevent this operation when the input register is in course of changing. Re-setting to zero of the end of conversion trigger unit.

1 Impulse $T_{r0}$: re-setting to zero of the positions $P_{n+1}$, $P_n$ before the beginning of a cycle; re-setting to zero the correction register of the carry-over trigger unit and the trigger unit containing $S'_0$.

These impulses may be chosen in the following manner: there is a counter counting $s$ times $(s \geqslant n+3)$ and a half-cycle trigger unit $F$. By means of the counter and $F$, it is easy to determine the systems which supply outputs equal to 1 at the above instants or periods of time.

FIG. 9 describes the general arrangement of the basic series converter. The register 1 is the input register (length $n$), the register 2 is the principal shifting register with the two left hand positions for the portion $X_{n+1}X_n$ of the residue. The register 3 is the correction shifting register. The block 4 represents the clock, the block 5 the programming device, $A_2$ and $A_3$ the forward movement controls of the registers 2 and 3 respectively. The block 6 is the unit which, starting from the residue, gives the three symbols of the highest rank of the pure binary coding $r_3$, $r_2$, $r_1$ of the remainder $R'$ and which associates this expression with the binary digit $S'_0$ put into the trigger unit of smallest weight of the group of four. The line joining 2 and 6 represents symbolically a connection supplying to the output 6: $X_{n+1}\overline{X}_{n+1}$, $X_n$ and $\overline{X}_n$ and $R_{n+1}$. The block 8 contains the "adder-residuator" with its carry-over trigger unit and the addition-residuation switching system.

The systems of FIGS. 3 and 8 can be represented by the equations:

(Fig. 3)

$$A=P_0\overline{T}_0$$
$$B=P_n\overline{F}+P'_0F$$
$$C=Z\overline{F}+P_0F$$
$$R=R_{k-1}$$

$T_0$ is equal to 1 at the time $t_0$ the initial time of the cycle.

(Fig. 8)

$$A=P_0\overline{T}_0$$
$$B=P_n\overline{F}+P'_0F$$
$$C=P_0\overline{F}+P_0F$$
$$R=R_{k-1}$$

The alternative form of the series converter according to the invention which has just been described (basic series converter) requires two re-circulations per decimal figure. From this converter, various alternative forms are possible, amongst which three essential alternatives will be referred to.

In these three alternatives, a system determines the remainder $R$ of the division of $S$ by 5; $S—R$ is then obtained by subtraction; finally, the residuator determines the quotient $S—R/5$. The system for determining the remainder can be either the residuator employed with an auxiliary register or another system which carries out the search for the remainder. In addition, the three above operations (division by 5, subtraction of the remainder, residuation) can be grouped together in various ways so that two or three of them are effected in a single re-circulation. More precisely, they may be carried out in the following manner:

In a first alternative, the quotient $S$ of the division of $S'$ by 2, and the remainder $R$ of the division by 5 of $S$ are determined as the first re-circulation of the remainder of the division of $S'$ by 10, from which the remainder of the division by 10 is obtained. In a second re-circulation, the calculation of $S—R$ is effected, and in the third, the calculation of $Q=S—R/5$ According to a second alternative method:

During the first re-circulation: the same operation as above.

During the second re-circulation: subtraction $S–R$ and division by 5.

Following a third alternative method:

First re-circulation: as before.

Second re-circulation: calculation of $S—R$, $S—R/5$ and the new residue. Then all the re-circulations are similar to the second.

In the first alternative, three re-circulations are required per decimal figure. The determination of the remainder can be made either by a system different from the residuator or by the residuator with an auxiliary register. In the first case, the same "adder-residuator" system is employed to determine the remainder, to effect the difference and to carry out the division by 5, by means of switching the inputs. The remainder $R'$ must be put into a shifting register with four positions, which is utilized for the subtraction. It re-circulates once during the first four shifts of the principal register so as to carry-out the subtraction.

In the second alternative, two re-circulations are required per decimal figure. As in the previous case, an adder-residuator is necessary, which may be employed to find the remainder and to carry-out the division by 5, together with a subtraction unit. The inputs of the subtractor are the position $P_0$ of the main register and the position $P''_0$ of the register containing the remainder. It is possible to arrange for this latter register to have a zero contents during the first re-circulation. The output of the subtractor serves as input for the adder-residuator.

Finally, in the third alternative above, one re-circulation is required per decimal figure. It is necessary to have a subtractor and two "adder-residuators", the first of which receives the output of the subtractor and carries out the division by 5, the second receiving the output from the first and effecting the determination of the remainder with an auxiliary register. This second adder-residuator may be replaced by another system which effects the determination of the remainder, when so required.

These three alternatives correspond to the case in which the remainder is wanted without the pseudo-quotient in the first re-circulation. In the case where the remainder and the pseudo-quotient are determined at the same time, two main alternatives may be considered:

In a first alternative, two re-circulations are required per decimal figure. This is essentially the alternative which has been described by the name of basic series converter. It will be recalled that an "adder-residuator" is necessary to effect by switching the residuation in the first re-circulation and the addition of the correction in the second.

In a second alternative, one decimal figure is found for each re-circulation. For this purpose, an "adder-residuator" and an adder are employed. Starting from the second re-circulation, at the same time as the correction is added with the adder device, the output of this latter is employed as the input of the adder-residuator. The quotient of a division and remainder of the following is then determined in a single re-circulation. The correction is zero during the first re-circulation.

There will now be described by way of examples other alternative forms of the converter according to the invention, especially in the parallel and series-parallel versions.

As has already been seen, the adder-residuator is essentially an additional subtraction device having special input connections. It is known that by juxtaposition of series adders, it is possible to form an adding device which is called a parallel adder and which carries out the addition in one clock time instead of in $n$ times. It is possible to proceed in a similar manner and, given a maximum length $n$ for the binary words, there will be employed $(n+2)-2$ adder-residuators (one per bit, except for the two of lowest rank). The interconnection is effected according to the equations given for the series case. These are always valid on condition that the numerical indices are interpreted as binary ranks and not as clock times. The relations then represent the interconnections and the asynchronous propagation of the signals towards the high ranks. The two figures of low rank of the pseudo-quotient are identical with those of the number to be treated.

In addition, the two adder-residuators corresponding to the two extreme left hand positions may only have two inputs, since the values $S_{n+1}, S_n$ are always zero. The operation of the series-parallel converter can be effected in several alternative ways, in manner similar to the series case.

According to a first alternative, during a first clock time, the remainder is determined together with the pseudo-quotient which appears on the outputs of the parallel "adder-residuator". In a second time, the correction is added in parallel from the register containing $R$. The periods of the correction are constituted by groups of four wires carrying the same binary profile. For this alternative, it may be desirable to utilize, as the basic cell, an adder in which the inputs are switched according to the diagram indicated above for the series case.

In this version, it can be seen that $2N_D$ clock times are necessary to effect the conversion, where $N_D$ is the number of decimal figures (it is known that $N_D = n/3.32$). In practice, the number $N_D$ will be calculated by finding the decimal equivalent of the largest pure binary number to be converted. Another alternative would consist in carrying out in parallel the determination of the remainder $D_k$, the determination of $S-R$ and finally that of $S-R/5$ (three clock times per decimal figure). This alternative is thus easily deduced from the case of the series converter.

It will however be observed that for this first particular alternative, it may be advantageous to utilize as the base cell the second version of the adder-residuator, that which presents itself as a subtractor, in which case the switching between the three phases will frequently be easier.

The series-parallel converters which have been described are in fact systems of the repetitive type with one dimension, which can be used in a sequential manner. This second repetition in time may be replaced by a "spatial" repetition of the same system of determination of remainder and quotient, as many times as there are decimal figures. For each decimal figure $D_i$ there will be a unit composed for example of a parallel adder-residuator $R_i$ giving the remainder and the pseudo-quotient and a parallel adder $A_i$, the inputs of which are the correction and the pseudo-quotient output of the parallel adder. The outputs of this parallel adder again serve as inputs for the system of the same type relating to $D_{i+1}$ (compound of a parallel "adder-residuator" $R_{i+1}$ and a parallel adder $A_{(i+1)}$), etc.

It should be noted that, contrary to the series case, it may be very advantageous to take account of the fact that the successive quotients of the divisions by 10 are each time reduced in length by at least three binary ranks.

As regards the length of the systems $A_i$ and $R_i$, there is also a choice between several possibilities: to treat the words of constant lengths equal to the maximum length, which is costly but makes it possible to have an identical coding for each decimal figure, or alternatively to carry-out the treatment by determining in threes the lengths of the successive decimal figures, but in that case the coding of the output figures varies with a period of 4. For a rank of which the length is thus $n-3a$, the output code corresponds to the length of the word $(n+\alpha)_4$, in which $n+\alpha)_4$ represents the remainder of the division of $n+a$ by 4.

Other solutions are possible, such as that which consists of reducing the length by quanta of 4, whenever this is possible. This enables the same coding to be retained for the decimal figures.

In the foregoing text, there have been described alternative forms according to the invention of converters which transform whole binary numbers to decimal numbers. If it is desired to treat mixed numbers, these can be dealt with in two phases: treatment of the whole portion and treatment of the fractional portion. For the fractional portion there may be employed the method of multiplication by 10, which can be considered as a multiplication by 2 followed by a multiplication by 5.

The equations for the multiplication of a number $X$ by 5 are: $(S=5X)$ $$S_k = X_k \oplus X_{k-2} \oplus R_{k-1}$$
$$R_k = X_k X_{k-2} + R_{k-1}(X_k + X_{k-2})$$

It is observed that these equations are derived from a first group of equations given for residuation, by changing over $X_k$ and $S_k$ in the first equation. When the second group of equations given for the residuation are considered, it is seen that there are obtained those of multiplication by changing over $S_k$ and $X_k$ in the first residuation equation and by replacing $S_k$ by $X_k$ in the second member of the second equation.

It is thus seen that, by means of switching the inputs, the same adder-residuator system can play the part of a multiplier by 5. The portion $P_{n+3}P_{n+2}P_{n+1}P_n$ of the register 2 increased by two positions, cerves to receive the overflow in the multiplication phase. This switching arrangement is easily obtained by those skilled in the art of logical circuits of calculating machines and, in consequence, it will not be described here.

Finally, the method which has been described can be applied to conversions other than the decimal binary conversion. If $m$ is the base, it is only necessary for that purpose to effect the inversion of the equations which give the multiplication by a whole $m$. By way of example, there will be described below two cases of this kind:

Assuming that is it desired in a sexagesimal binary conversion to obtain the sexagesimal symbols in the binary-coded form, the method according to the invention is as follows: successive divisions by 60, obtained by division by 4 (a shift of two positions) followed by division by 15, carried out by at least one adder-residuator device. A system of equations representing this latter is as follows:

$$X_k = S_k \quad X_{d-4} \quad R_{k-1}$$
$$R_k = X_{k-4} R_{k-1} + X_{k-4} x_k + X_k R_{k-1}$$
$$(X_{-1}, X_{-2}, X_{-3}, X_{-4} = 0 \qquad R_{-1} = 0)$$

In addition, it is possible to utilize the symbol $X_k$ or $S_k$ indifferently in the equation which gives $R_k$. In its second form, this latter is written:

$$R_k = \bar{X}_{k-4} R_{k-1} + \bar{X}_{k-4} S_k + S_k R_{k-1}$$

The residuation can be continued up to the last figure $(S_{n-1})$ only, and the relation which associates the residue $r = X_{n-1} X_{n-2} X_{n-3} X_{n-4}, R_{n-1}$ and the remainder of the division by 15 is (for $n=4p$):

$$r - R_{n+1} + R \equiv 0 \qquad \text{(modulo 15)}$$

The process may be effected in this manner, and it is easy to produce a system which can mechanize the above relation.

However, it is possible to accept the loss of four rows of the shifting register and to continue the residuation up to row $P_{n+3}$ inclusive. If the word ($X_{n+3}\ X_{n+2}\ X_{n+1}\ X_n$) is then called the residue $r'$, it can then be shown that if $r'=0$, $R=0$ and if $r'$ is not equal to 0, then $r'+R=15$. In other words, when $r'$ is other than 0, the remainder $R$ is the complement to 1 of $r'$.

As the complementary outputs are available for each rank, $R$ is thus obtained directly by taking the complementary word $r'$ and this is therefore very favorable for the case in which $n=4p$. There are however given below the formulas which should be mechanized by a logical system (for example by a matrix of diodes) for the other cases:

$$n=4p+1 \quad 2r-2R_{n-1}\pm R\equiv 0$$
$$2r'+R\equiv 0$$
$$n=4p+2 \quad 4r-4R_{n-1}+R\equiv 0$$
$$4r'+R\equiv 0$$
$$n=4p+3 \quad 3r-3R_{n-1}+R\equiv 0$$
$$3r'+R\equiv 0$$

In practice, if it is desired to write the factual tables associating remainders and residues, it will be convenient to find the residues of the numbers from 0 to 14 directly by continuing the residuation up to row 12 inclusive. Examination of the four sections of four adjacent symbols which can be formed between the positions 5 and 12, gives for each remainder the four possible forms of the residue. The correction which should be applied to the pseudo-quotient is periodic with a period of 4 when $n=4p$, and the period is the representation in pure binary form of the remainder $R$. When $n \neq 4p$ ($n=4p+1$), the correction is obtained from the same periodic word with $p$ periods and $l$ right hand binary symbols of the period. The addition will be made in modulo $2^n$.

```
         S=  0 0 0 1 1 0 0 1 0 1 1 1           (=407)
         X= [1 1 0 1]1 1 1 1 1 0 0 1
         R= [0]0 0 1 1 1 1 1 1 1 1 1
         Residue
         r=  1 1 0 1 - ——→R = 0 0 1 0      R=2
then: Q  X=  0 0 1 0 0 0 1 0 0 0 1 0
               X = 1 1 0 1 1 1 1 1 1 0 0 1
             Q X = 0 0 1 0 0 0 1 0 0 0 1 0
               Q = 0 0 0 0 0 0 0 1 1 0 1 1
                     Q = 1 1 0 1 1 =27    Q=27
```

The remainder of the division by 60 is equal to $4R=+|(S'_1 S'_0)|$ in which ($S'_1S'_0$) is the number represented by the two figures $S'_1$, $S'_0$ of lowest order of $S'$. This number is put into memory during the shifting by two positions. By writing it to the right of $R$, the binary expression of the desired remainder is obtained. In practice, when it is desired to convert pure binary numbers to a sexagesimal representation, the sexagesimal symbols are coded in decimal. To give an example, a number with three sexagesimal figures will be written:

$$N=(k^1_2K^0_2)\ (K^1_1\ K^0_1)\ (k^1_0\ k^0_0)$$

in which $k^1_i$ $k^0_i$ is the decimal representation of a sexagesimal figure. Under these conditions, the decimal figures $k^j_i$ will be obtained by dividing successively by 10, 6, 10, 6, etc. in an alternate manner, beginning by 10. Each division by 10 or by 6 can be made by an "adder-residuator". There will be explained the modifications to be made in the series case, the transposition to the other cases being immediate.

The equations of the residuation by 3 are as follows:

$$X_k=S_k\oplus X_{k-1}\oplus R_{k-1}$$
$$R_k=X_kX_{k-1}+R_{k-1}(X_k+X_{k-1})$$

or $$X_k=S_k\oplus X_{k-1}\oplus R_{k-1}$$
$$R_k=\overline{S}_kX_{k-1}+R_{k-1}\overline{S}_k+R_{k-1}X_{k-1}$$

with $$X_{-1}=0,\ R_{-1}=0$$

They will be obtained from those of the residuation by 5, by replacing $X_{k-2}$ by $X_{k-1}$. This defines the switching to be effected, which is easy.

The residue is in this case the pair, $R_nX_n$. If $R_n=0$, $R=0$; if $R_n=1$, $R\neq 0$ and $R$ is given by the table:

| R | $R_n$ | $X_n$ | R | $R_n$ | $X_n$ |
|---|---|---|---|---|---|
| 0 | 0 | 0 | 0 | 0 | 0 |
| 1 | 1 | 0 | 1 | 1 | 1 |
| 2 | 1 | 1 | 2 | 1 | 0 |
| (n = 2p) | | | (n = 2p+1) | | |

The correction to be added to the pseudo-quotient is periodic with a period of 4 when $n=4p$, and the period is the binary representation of the number $5R$.

The conversion is thus effected by cycles corresponding alternately to the division by 10 and by 6. There is required a trigger unit $\phi$ indicating the divider (for example $\phi=1$: division by 5, $\phi=0$: division by 3).

Numerous alternatives are possible, as in the case of the decimal conversions. In particular, in a single re-circulation, it is possible to effect the correction relative to one divider and the residuation relative to the other, etc. The remainder of the division by 6 is for example given, when $n=2p$, by ($X_n\ \overline{X}_n\ S'_0$) $R_n$, since $n=2p+1$ by ($X_n\ \overline{X}_n\ S'_0$) $R_n$. In the binary conversions of the sexagesimal or analogue types, the code may be irregular for certain sexagesimal orders (the case of the hours of the day) and the sequence of the alternate divisions by 10 and 6 would be in consequence easily modified.

It is furthermore possible to obtain other simple alternatives by elementary manipulations of Boole algebra, in order to take account of the logic operators which are available (AND - OR, negation, NO - AND, NO - OR, majority logic, etc.) in particular, or to take into account the electronic characteristics of these latter (times of propagation, impedance, etc:) or of certain logic characteristics (fan in, fan out).

During the determination of the remainder, there has been described above the general case in which the residuation is continued after the digit of the highest order of the word, in such manner that the remainder can be read from the residue only. As has been seen for example in the case of conversions to sexagesimal code, it is not absolutely necessary and in certain cases it is not always necessary to go as far as this, However, this results in a decoding of the residue which is different and in general more complicated. The length of the shifting register in the series case, or of the parallel operators in the series-parallel or parallel cases then depends on the choice which has been made.

The following example of application will bring out more clearly the operation of the invention. It is selected for the case in which the dividend is an exact multiple of 5. There is indicated first of all the binary representation of the multiplication of 15 by 5, and then the representation of the extraction of the quotient in the adder-residuator according to the invention.

MULTIPLICATION BY 5

Multiplicand "a" × multiplier 5 = multiplicand "a" ($2^2+2^0$)

| | | | | | | | | |
|---|---|---|---|---|---|---|---|---|
| $2^0$ × multiplicand "a" | 0 | 0 | 0 | 1 | 1 | 1 | 1 | (15) |
| $2^2$ × multiplicand "a" | 0 | 1 | 1 | 1 | 1 | 0 | 0 | |
| product "d" | 1 | 0 | 0 | 1 | 0 | 1 | 1 | |
| carry-overs "c" | 0 | 1 | 1 | 1 | 1 | 0 | 0 | |

DIVISION BY 5

```
dividend "d"      0  0  1  0  0  1  0  1  1
quotient "a"     [0  0] 0  0  0  1  1  1  1
carry-overs "c"  [0] 0  0  1  1  1  1  0  0
                     A
```

The checking column (A) comprises the block of residual digits or "residue" (enclosed by a continuous line) in the quotient and in the carry-overs.

The arrows indicate the action of the addition operation which supplies the digit of rank 2 of the quotient (the least significant digit has rank zero) and the path in dotted lines shows the action of the operation which supplies the digit of rank 3 of the quotient.

Table III which follows gives the whole of the possible combinations for the application of the majority rule in the choice of the carry-over digit $c$.

TABLE III

| a | b | c | Arithmetic | Modulo sum 2 "d" | Carry-over c |
|---|---|---|---|---|---|
| 0 | 0 | 0 | 0 | 0 | 0 |
| 0 | 0 | 1 | 1 | 1 | 0 |
| 0 | 1 | 0 | 1 | 1 | 0 |
| 0 | 1 | 1 | 2 | 0 | 1 |
| 1 | 0 | 0 | 1 | 1 | 0 |
| 1 | 0 | 1 | 2 | 0 | 1 |
| 1 | 1 | 0 | 2 | 0 | 1 |
| 1 | 1 | 1 | 3 | 1 | 1 |

The method of the division by 5 according to the invention comprises essentially the following operations:

1. Preparation of the Two Digits of Lowest Weights

It has been observed that the number 5 can be written: $2^2 + 2^0$.

In order to carry out a multiplication of a binary word by 5, it is thus only necessary:

to displace the word by two ranks towards the higher units;

to add to the word thus displaced the word which is not displaced.

The two digits of the lowest rank to the right of the sum thus obtained are then actually those of the undisplaced word, and there are no carry-overs to these two ranks.

When division is effected, and if the word is an exact multiple of 5, the two last digits of the quotient word are therefore known by simple reading of the dividend word, and it is only necessary to put them into memory.

2. Preparation of the Digit Following, or Digit of Rank 2 of the Quotient

It has been noted that in a modulo 2 addition, that is to say an addition in which only the remainder of the division by 2 is retained, or again the addition which is produced at each rank in a binary calculator, if we have:

$a + b + c = d$ (1′) corresponding to (1)

We have also, in particular:

$a + d + b + c$ (2′) corresponding to (2).

From the multiplication by 5 with which equation (1′) is associated we shall pass to the reverse operation, division by 5, by applying equation (2′).

In order to find the third digit of the rank "2" or digit $a$, we proceed in the case of the following example to the modulo 2 addition of the three digits.

0 (figure of rank 2 of the dividend), 0 (figure of rank 0 of the divedend), 0 (carry-over of rank 1)

(see the indicating arrows in full lines at the first residuation of Example II).

As far as the carry-over is concerned, it has been found that in the operations (1′) and (2′):

the carry-over of the addition in binary is the same in both operations;

the addition (1′) $a + b + c = d$ giving for $d$ gross (before reduction in modulo 2) only one or the other of the four possible values 0, 1, 2 or 3, and the carry-over being therefore always equal to 1 or 0, this carry-over is a "majority function" of the three digits of the addition in question, that is to say the carry-over digit is the same as that of the majority digit present necessarily at least twice among the three digits $a$, $b$ and $c$, which means that in the present case it is 0.

From this stage onwards, we have thus available the carry-over 0 necessary to find at the next stage the fourth digit of the desired quotient.

3. Preparation of the Digit of Rank 3

The rule to be followed is the same by recurrence. The modulo 2 addition is carried out of the three digits:

1 (figure of rank 3 of the dividend), 1 (figure of rank 1 of the dividend), 0 (carry-over of rank 2)

(see the broken line path in the first residuation of Example II).

The carry-over brought down is 0, and so on.

4. Determination of the Remainder

If the division by 5 is exact, the division is terminated after exploration of the figure of rank $n$ of the highest weight of the dividend. It is then found that zeros are subsequently registered in the quotient if the exploration is continued beyond the said figure of rank $n$.

If the division by 5 is not correct, the continuation of the exploration beyond the figure or rank $n$ is possible indefinitely, by continuing to lower figures to the quotient, but the sequence of the carry-over digits and the quotient digits makes it possible to determine the remainder and the correction element.

If the carry-over digit after the exploration of the second figure of rank higher than $n$ is equal to 1, this means that the dividend is not a multiple of 5 (and conversely). In this case, this residue must be translated according to the indications of Table I in order to determine the remainder.

In this case, $n = 4p$. The excess quotient digits are 01, the remainder is 2.

5. Second Passage and Corrector Term

In addition however, in this case the quotient (or rather the pseudo quotient) supplied by the method is always false.

It has been found and proved that the corrector term to be added to the pseudo quotient initially found may be put in the simple form of a periodic binary term of period four, the said period being the binary representation of the remainder multiplied by 3 (see Table II).

In this case, the period is 0110, the binary expression of 6.

An alternative method makes it possible to avoid the two successive treatments which are imposed when the majority function which gives the carry-over treats the actual result $a$ of the operation. In order to obtain the carry-over figure, not from the elements $a$, $b$, $c$, in which $a$ is the modulo 2 sum term, but from the elements $d$, $b$ and $c$ which serve to prepare $a$, the complement $d'$ of d is taken and the majority function is established from the three digits $d'$, $b$ and $c$.

It will of course be understood that the present invention has only been described purely by way of explanation and without any limitation, and that any alternative form may be given to it without thereby departing from its scope.

The converter according to the invention can in particular be employed as:

A laboratory apparatus.

By means of an adaptation, when so required, of the levels of voltage, impedances, etc., it can be connected to an arithmetic system (register of a computer memory, etc.), thus permitting the experimenter to read directly in decimals, numbers in pure binary form.

Calculator output device.

It can be employed inside an input-output unit as a coupling to a visual indication system (electronic or electro-mechanical in particular). It may be multiplexed between a number of binary sources.

The series converts can be constructed in a convenient manner in a drum computer by utilizing tracks on the drum as shifting registers (in a re-circulating register).

The central member of an arithmetic calculator unit, since the adding function is one of the special functions obtained from the main unit (adder-residuator) of the conversion system.

A coding device for a calculating machine using the system of numeration of residual classes. The determination of the residues $R_i$ relating to each module $m_i$ can be effected simultaneously with converters having auxiliary registers or successively by switching.

What is claimed is:

1. A device for converting a whole number $S'$ expressed in the binary system and with a maximum of $n$ bits represented by the expression $(S'_{n-1} S'_{n-2} \ldots S'_2 S'_1 S'_0)$ to its equivalent decimal number represented by the expression $D_{m-1} D_{m-2} \ldots D_2 D_1 D_0$, comprising a main shift register having $n + 2$ bit positions represented by the expression $P_{n+1} P_n \ldots P_2 P_1 P_0$; a correction shift register having four bit positions; an adder-residuator means having inputs from said registers and an output feedback loop to said main shift register and including a carry-over trigger unit; an output circuit having an input from said adder-residuator, an output to said correction shift register and including a logical inscription unit and an output register; and switching and programming means governing the sequence of operation of the above elements, wherein, for operation, the number $S'$ is entered in the main shift register with $S_k$ in position $P_k$ for $k=0$ to $n$ inclusive and 0 in positions $P_{n+1}$ and $P_n$ and a two part cycle is commenced, in the first part of which $S'$ is divided by two by a shift of one position throughout the main shift register to give a number $S$, with remainder $S'_0$ being entered in said output register, the number $S$ is applied in sequence lowest order digit first to the adder-residuator means which provides a "pseudo-quotient" represented by the expression $X$ $(X_{n+1} X_n \ldots X_1 X_0)$ where $X_k + S_k + X_{k+2} + R_{k+1}$ (modulo 2), "carry-over" $R_k$=Maj $(X_k, X_{k+2} R_{k+1})$ and $X_{+1}, X_{+2}=0$, $R_{+1}=0$, $X$ is fed back into said main shift register and $X_{n+1}$, $X_n$ and $R_{n+1}$, forming a residue, are entered in said inscription unit which, in accordance with their values and the number n provides a remainder $R$ for division of $S$ by 5 to give a remainder $R'=2R+S'_0$ for division of $S'$ by 10 in said output register, and sets a correction sequence of four digits in said correction shift register, and in the second part of which cycle pseudo-quotient $X$ is added in the adder-residuator to the correction number consisting of a cyclic sequence of said four digits to give a true quotient $Q$ which is entered in said main shift register, the cycles being repeated with $Q$ being operated on as $S'$ to give successive remainders $R'=D_0, D_1 \ldots D_{m-1}$.

2. A device as claimed in claim 1, wherein bit positions $P_{n+1}$ and $P_n$ have connections to said inscription unit whereby the digits $X_{n+1}$ and $X_n$ are transferred to that unit when $X$ is entered in the main shift register.

3. A device as claimed in claim 2, wherein $n=4p$ where $p$ is an integer and said inscription unit includes four AND gates having a common control from the switching and programming means and respective inputs for $X_{n+1}$, $\overline{X}_{n+1}$, $X_n$, $\overline{X}_n$, the four outputs being to the four bit positions of the correction register.

4. A device as claimed in claim 1, and further comprising an input register having $n$ bit positions for the number $S'$ connected to said main shift register.

5. A device as claimed in claim 3, and further comprising an input register having $n$ bit positions for the number $S'$ connected to said main shift register.

6. A device as claimed in claim 1, and further comprising an output memory connected to said output register for storing remainders $R'$.

7. A device as claimed in claim 5, and further comprising an output memory connected to said output register for storing remainders $R'$.

8. A device as claimed in claim 1, wherein said adder-residuator is adapted to provide Maj $(X_k, X_{k-2}, R_{k-1})$ by evaluating $X_k X_{k-2} + R_{k-1} X_k + R_{k-1} X_{k-2}$ (modulo 2).

9. A device as claimed in claim 7, wherein said adder-residuator is adapted to provide Maj $(X_k, X_{k-2}, R_{k-1})$ by evaluating $X_k X_{k-2} + R_{k-1} X_k + R_{k-1} X_{k-2}$ (modulo 2).

10. A device as claimed in claim 1, wherein said adder-residuator is adapted to provide Maj $(X_k, X_{k-2}, R_{k-1})$ by evaluating $\overline{S}_k X_{k-2} + X_{k-2} R_{k-1} + \overline{S}_k R_{k-1}$ (modulo 2).

11. A device as claimed in claim 7, wherein said adder-residuator is adapted to provide Maj $(X_k, X_{k-1}, R_{k-1})$ by evaluating $\overline{S}_k X_{k-2} + X_{k-2} R_{k-1} + \overline{S}_k R_{k-1}$ (modulo 2).

12. A device as claimed in claim 1, wherein said output register includes four trigger units, three of which receive the remainder $R$ in binary form $r_3 r_2 r_1$ from said inscription unit to whose inputs is applied the residue, and the other one of which receives $S'_0$, said trigger units giving as an output the binary version of the decimal remainder $R'$ under the control of the switching and programming means.

13. A device as claimed in claim 11, wherein said output register includes four trigger units, three of which receive the remainder $R$ in binary form $r_3 r_2 r_1$ from said inscription unit to whose inputs is applied the residue and the other one of which receives $S'_0$, said trigger units giving as an output the binary version of the decimal remainder $R'$ under the control of the switching and programming means.

14. A device as claimed in claim 1, wherein a zero quotient detecting device is provided including a gate for the quotient open during the second part of the cycle, a trigger unit responsive to the successive quotient signals to change its condition when a non-zero signal occurs and a gate for the output of the trigger unit controlled by an end of cycle signal to give an output at that time indicative of the condition of the trigger unit and hence of the presence of non-zeros in the quotient.

15. A device as claimed in claim 13, wherein a zero quotient detecting device is provided including a gate for the quotient open during the second part of the cycle, a trigger unit responsive to the successive quotient signals to change its condition when a non-zero signal occurs and a gate for the output of the trigger unit controlled by an end of cycle signal to give an output at that time indicative of the condition of the trigger unit and hence of the presence of non-zeros in the quotient.

16. A device as claimed in claim 1, wherein said carry-over trigger unit in the adder-residuator device is a memory for one bit whose contents $R_{k-1}$ entered during the cycle are applied to the adder for determining $X_k$ and the residuator for determining $R_k$ during the succeeding cycle, $R_k$ being entered in said memory in the second part of said succeeding cycle.

17. A device as claimed in claim 15, wherein said carry-over trigger unit in the adder-residuator device is a memory for one bit whose contents $R_{k-1}$ entered during the cycle are applied to the adder for determining $X_k$ and the residuator for determining $R_k$ during the succeeding cycle, $R_k$ being entered in said memory in the second part of said succeeding cycle.

18. A device as claimed in claim 1, wherein the adder-residuator has an auxiliary register, and the switching and programming means is adapted to govern operation in three part cycles, in the first part of which $S$ is determined from $S'$ $(S'=2S+S'_0)$ and stored in the main shift register and remainder $R$of the division by 5 of $S$ is determined and stored in the auxiliary register while $R'=2R+S'_0$ is available from the output circuit, in the second part of which $R$ is subtracted from $S$ in the adder-residuator and $S—R$ is stored in the main shift register, and in the third part of which $S—R/5$ is determined to give the quotient $Q$ which is entered in the main shift register for the next succeeding cycle of operations.

19. A device as claimed in claim 17, wherein the adder-residuator has an auxiliary register, and the switching and programming means is adapted to govern operation in three part cycles, in the first part of which $S$ is determined from $S'$ $(S'=2S+S'_0)$ and stored in the main shift register and remainder $R$ of the division by 5 of $S$ is determined and stored in the auxiliary register while $R'=2R+S'_0$ is available from the output circuit, in the second part of which $R$ is subtracted from $S$ in the adder-residuator and $S—R$ is stored in the main shift register, and in the third part of which $S—R/5$ is determined to give the quotient $Q$ which is entered in the main shift register for the next succeeding cycle of operations.

20. A device as claimed in claim 1, with the modification that the adder-residuator has an associated subtraction unit and auxiliary register, and the switching and programming means is adapted to govern operation in two part cycles, in the first part of which $S$ is determined from $S'$ $(S'=2S+S'_0)$ and stored in the main shift register and remainder $R$ of the division by 5 of $S$ is determined and stored in the auxiliary register, while $R'=2R+S'_0$ is available from the output circuit, and in the second part of which the outputs of the main shift and auxiliary registers are applied to the subtraction unit which delivers $S—R$ to the adder-residuator which in turn delivers $Q=S—R/5$ to the main shift register.

21. A device as claimed in claim 17, with the modification that the adder-residuator has an associated subtraction unit and auxiliary register, and the switching and programming means is adapted to govern operation in two part cycles, in the first part of which $S$ is determined from $S'$ ($S' = 2S + S'_0$) and stored in the main shift register and remainder $R$ of the division by 5 of $S$ is determined and stored in the auxiliary register, while $R'$ $2R + S'_0$ is available from the output circuit, and in the second part of which the outputs of the main shift and auxiliary registers are applied to the subtraction unit which delivers $S—R$ to the adder-residuator which in turn delivers $Q = S—R/5$ to the main shift register.

22. A device as claimed in claim 1, with the modification that the adder-residuator has an associated subtraction unit and a remainder determining system, such as a further adder-residuator, and the switching and programming means is adapted to govern operation in a single part cycle in which $S$ is determined from $S'$ ($S' = 2S + S'_0$), remainder $R$ of the division by 5 of $S$ is determined by said adder-residuator and $S—R$ is applied to the remainder determining system which delivers $Q = S—R/5$ to the main shift register.

23. A device as claimed in claim 17, with the modification that the adder-residuator has an associated subtraction unit and a remainder determining system, such as a further adder-residuator, and the switching and programming means is adapted to govern operation in a single part cycle in which $S$ is determined from $S'$ ($S' = 2S + S'_0$), remainder $R$ of the division by 5 of $S$ is determined by said adder-residuator and $S—R$ is applied to the remainder determining system which delivers $Q = S—R/5$ to the main shift register.

24. A device as claimed in claim 1, wherein the adder-residuator has an associated adder and the switching and programming means is adapted to govern operation in a single part cycle in which $S$ is determined from $S'$ ($S' = 2S + S'_0$) and the pseudo-quotient is produced by the adder-residuator and added to the correction sequence derived from it in said associated adder, the resultant quotient being entered in said main shift register for the next succeeding cycle of operations.

25. A device as claimed in claim 17, wherein the adder-residuator has an associated adder and the switching and programming means is adapted to govern operation in a single part cycle in which $S$ is determined from $S'$ ($S' = 2S + S'_0$) and the pseudo-quotient is produced by the adder-residuator and added to the correction sequence derived from it in said associated adder, the resultant quotient being entered in said main shift register for the next succeeding cycle of operations.

26. A device as claimed in claim 1, wherein $n$ adder-residuators are provided in parallel associated with bit positions $P_{n+1}$ $P_n \ldots P_2$, of the main shift register.

27. A device as claimed in claim 25, wherein $n$ adder-residuators are provided in parallel associated with bit positions $P_{N+1}$ $P_N \ldots P_2$, of the main shift register.

28. A device as claimed in claim 1, wherein there are provided $m$ units including an adder-residuator and an adder corresponding to the $m$ decimal digits, the adder-residuator $R_i$ being arranged to give the remainder and pseudo-quotient from which $D_i$ is available, and the adder $A_i$ having inputs from the associated correction register and the adder-residuator $R_i$ to give the quotient $Q_i$ which is an input for the next unit including adder-residuator $R_{i+1}$ and adder $A_{i+1}$.

29. A device as claimed in claim 25, wherein there are provided $m$ units including an adder-residuator and an adder corresponding to the $m$ decimal digits, the adder-residuator $R_i$ being arranged to give the remainder and pseudo-quotient from which $D_i$ is available, and the adder $A_i$ having inputs from the associated correction register and the adder-residuator $R_i$ to give the quotient $Q_i$ which is an input for the next unit including adder-residuator $R_{i+1}$ and adder $A_{i+1}$.

30. A device as claimed in claim 1 and also adapted to cover mixed numbers, wherein the whole number part is converted as stated and wherein the switching and programming means is adapted to switch inputs of the adder-residuator whereby multiplication of the fractional number part by 10 is obtainable, said main shift register having further bit positions $P_{n+3}$ and $P_{n+2}$ to receive multiplication overflow.

31. A device as claimed in claim 29 and also adapted to convert mixed numbers, wherein the whole number part is converted as stated and wherein the switching and programming means is adapted to switch inputs of the adder-residuator whereby multiplication of the fractional number part by 10 is obtainable, said main shift register having further bit positions $P_{n+3}$ and $P_{n+2}$ to receive multiplication overflow.

* * * * *

UNITED STATES PATENT OFFICE
CERTIFICATE OF CORRECTION

Patent No. 3,660,837 Dated May 2, 1972

Inventor(s) Jean Pierre Chinal

It is certified that error appears in the above-identified patent and that said Letters Patent are hereby corrected as shown below:

In column 1, line 8, the related U. S. Application Data should read as follows:

Continuation of Ser. No. 594,873, Nov. 16, 1966,

Signed and sealed this 12th day of December 1972.

(SEAL)
Attest:

EDWARD M.FLETCHER,JR.
Attesting Officer

ROBERT GOTTSCHALK
Commissioner of Patents